(12) United States Patent
Sheng et al.

(10) Patent No.: US 7,495,809 B2
(45) Date of Patent: Feb. 24, 2009

(54) SCANNING DEVICE CAPABLE OF QUICKLY STARTING SCANNING

(75) Inventors: Thomas Sheng, Hsinchu (TW); Ching-Jung Tu, Hsinchu (TW)

(73) Assignee: Avision Inc. (TW)

( * ) Notice: Subject to any disclaimer, the term of this patent is extended or adjusted under 35 U.S.C. 154(b) by 875 days.

(21) Appl. No.: 10/318,042

(22) Filed: Dec. 13, 2002

(65) Prior Publication Data

US 2004/0114197 A1 Jun. 17, 2004

(51) Int. Cl.
*H04N 1/04* (2006.01)
(52) U.S. Cl. .................. 358/474; 358/486; 358/497; 358/496
(58) Field of Classification Search .......... 358/474, 358/505, 487, 498, 486
See application file for complete search history.

(56) References Cited

U.S. PATENT DOCUMENTS

| | | | | |
|---|---|---|---|---|
| 5,132,786 A | * | 7/1992 | Ishiwata | 358/500 |
| 5,760,412 A | * | 6/1998 | Yang et al. | 250/559.4 |
| 5,912,747 A | * | 6/1999 | Murakami | 358/497 |
| 6,753,982 B1 | * | 6/2004 | Sheng et al. | 358/474 |
| 7,395,968 B2 | * | 7/2008 | Dickson et al. | 235/462.01 |
| 2003/0112476 A1 | * | 6/2003 | Chen et al. | 358/474 |
| 2007/0013972 A1 | * | 1/2007 | Sheng | 358/474 |
| 2008/0062474 A1 | * | 3/2008 | Yoo | 358/474 |

* cited by examiner

*Primary Examiner*—Negussie Worku (57) ABSTRACT

A scanning device capable of quickly starting scanning is placed on a base platform. The scanning device includes a housing, a glass platen, a scanning module, a control circuit and a scan-start unit. The housing has a top surface and a bottom surface. The glass platen, on which a to-be-scanned document is placed, is mounted on the top surface. The scanning module is movably installed within the housing to scan the to-be-scanned document. The control circuit controls the scanning module to proceed with a scan operation. The scan-start unit is electrically connected to the control circuit and mounted on the housing and in direct contact with the base platform. When a user applies a direct/indirect pressing force on the to-be-scanned document, the scanning module is triggered to start the scan operation.

9 Claims, 8 Drawing Sheets

SCANNING DEVICE CAPABLE OF QUICKLY STARTING SCANNING

BACKGROUND OF THE INVENTION

1. Field of the Invention

The invention relates to a scanning device, and more particularly to a scanning device capable of quickly starting scanning.

2. Description of the Related Art

Conventionally, before a scanning device starts scanning, an upper cover of the scanning device has to be opened. Then, a to-be-scanned document is placed on a glass platen and the upper cover is closed. Next, a key on the scanning device or a button on the software interface is pressed and the scan operation is thus initiated When a lot of documents, such as pages of a book, are to be scanned, it is time-consuming to repeat the above-mentioned operations. In addition, the open and close operations for the upper cover tend to make the to-be-scanned document deviate from the scan position when smaller documents, such as checks, receipts, and the like, are to be scanned. Furthermore, the complicated initiation operations may cause inconvenience to workers in the customhouse, airport or bank because they may need to frequently scan documents, such as passports, exhibits, savings-account books.

Figure 1:
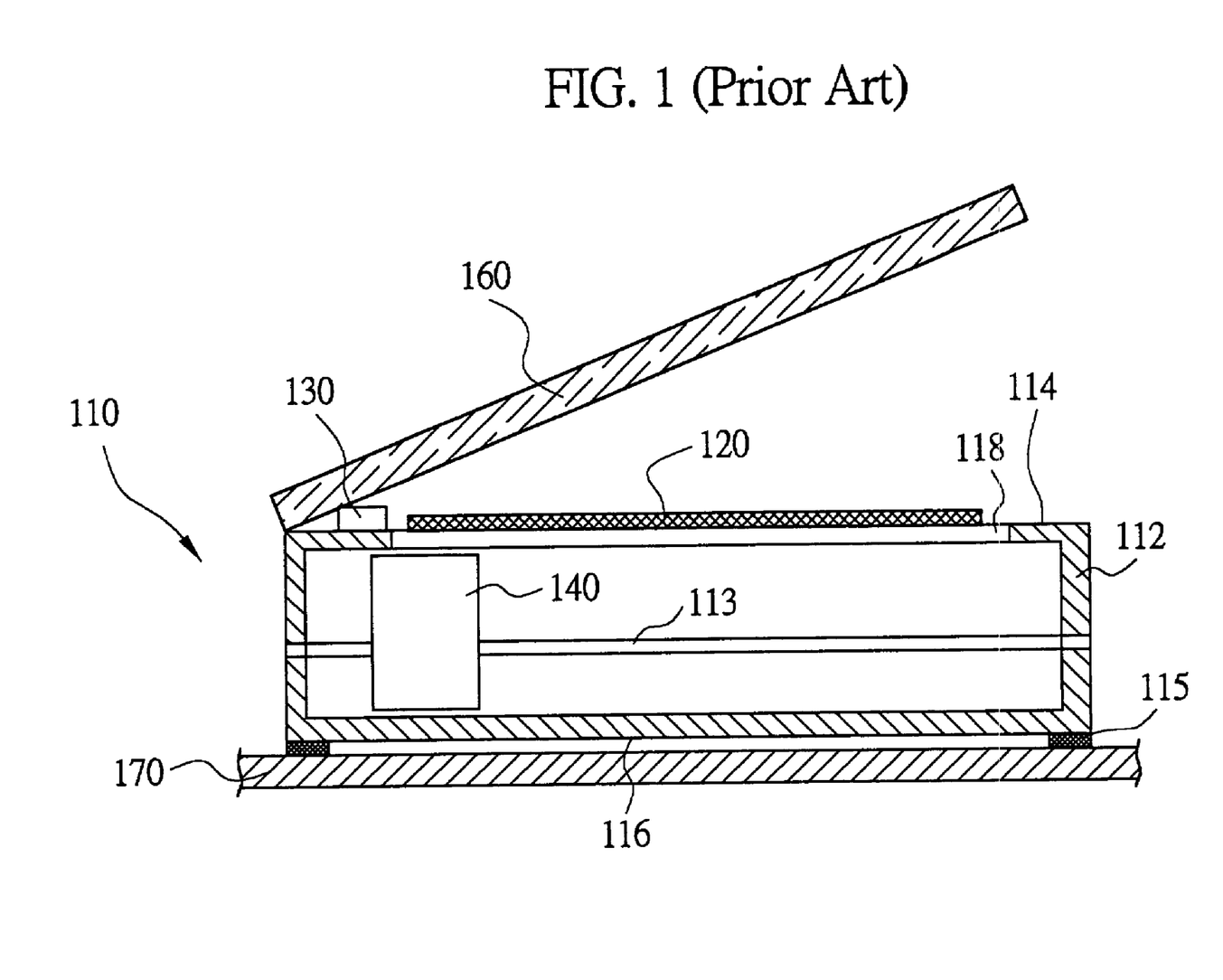
FIG. 1 is a schematic illustration showing a conventional scanning device.

It is to be noted that the so-called scanning device of the invention is not limited to only a scanner In other words, any device capable of scanning images may be applied to this invention For example, the scanning device may include a copier, a fax machine, a multi-function peripheral, and the like Referring to FIG. 1, a scanning device 110 is placed on a base platform 170, which may be a table, a floor, and the like. The scanning device 110 includes a housing 112, a guiding rod 113, a plurality of support feet 115, a glass platen 118, a scan-start unit 130, a scanning module 140 and an upper cover 160

The housing 112 has a top surface 114 and a bottom surface 116. The glass platen 118 is mounted on the top surface 114. Before scanning, the upper cover 160 is opened, and a to-be-scanned document 120 is placed over the glass platen 118. Then, the upper cover 160 is closed so that the upper cover 160 may press the scan-start unit 130, which may be a press switch. Thus, the scanning module 140 may perform a scan operation under control of a control unit (not shown).

Figure 2:
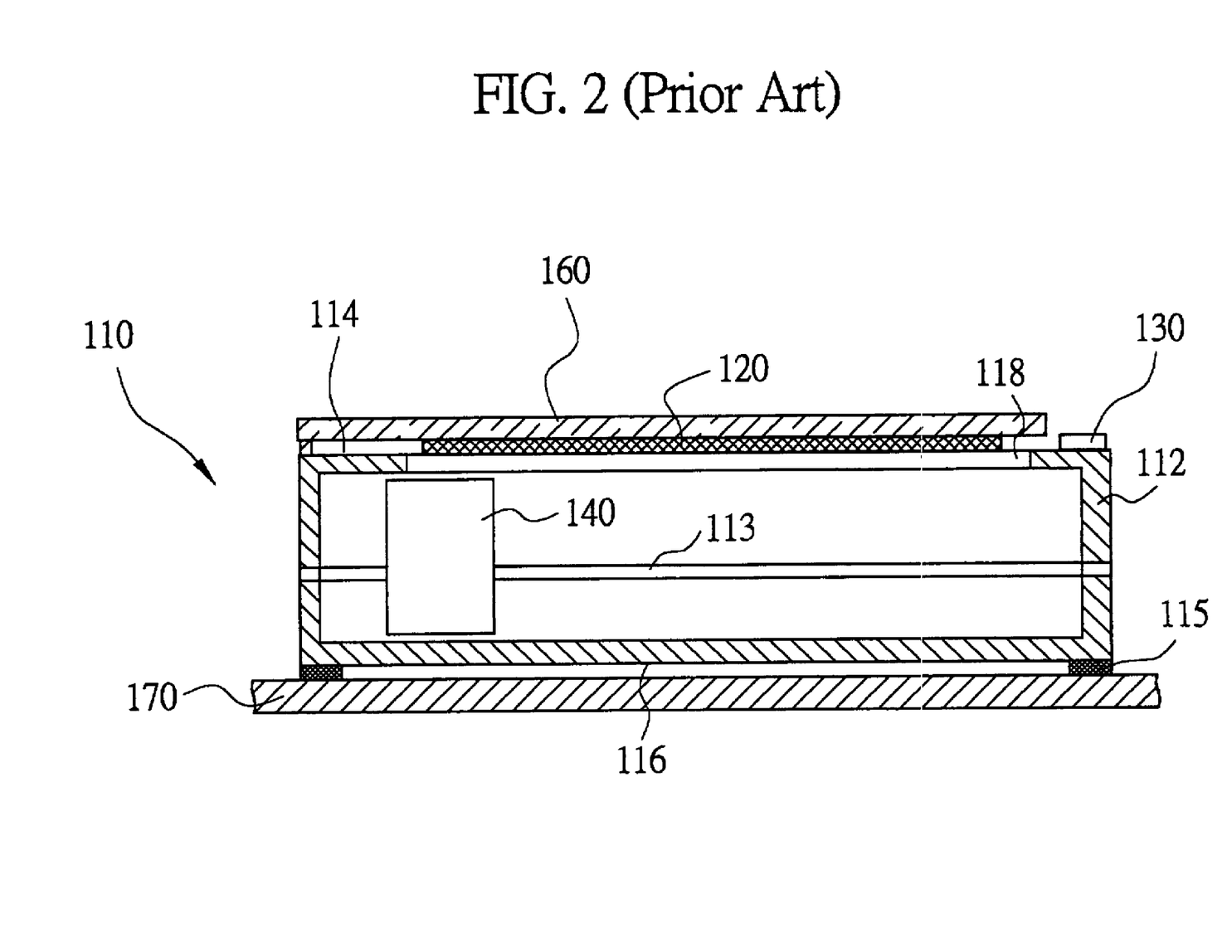
FIG. 2 is a schematic illustration showing another conventional scanning device

When a lot of documents are to be scanned by this scanning device 110, the frequent open and close operations for the upper cover 160 may possess the above-mentioned drawbacks FIG. 2 is a schematic illustration showing another conventional scanning device, which is similar to that of FIG. 1. The only difference resides in that the scan-start unit 130 is a key pressed by a user to initiate the scan operation without being triggered by the upper cover 160.

When the above-mentioned scanning device 110 is utilized to scan a book, the user has to press the book by one hand, and press the key by the other hand to initiate the scan operation. It is quite inconvenient to a user who wants to scan a lot of pages of a book.

Therefore, it is an important subject of the invention to provide a scanning device capable of conveniently and quickly starting scanning.

SUMMARY OF THE INVENTION

It is therefore an object of the invention to provide a scanning device capable of quickly starting scanning.

Another object of the invention is to provide a scanning device capable of conveniently starting scanning.

According to one aspect of the invention, a scanning device to be placed on a base platform includes a housing, a glass platen, a scanning module, a control circuit, and a scan-start unit. The housing has a top surface and a bottom surface away from the top surface and close to the base platform. The glass platen is mounted on the top surface, wherein a to-be-scanned document is to be placed on the glass platen. The scanning module is movably installed within the housing for scanning the to-be-scanned document. The control circuit controls the scanning module to perform a scan operation. The scan-start unit is electrically connected to the control circuit and mounted on the housing and in direct contact with the base platform. The scan-start unit is triggered by a direct/indirect pressing force, which is directly/indirectly applied to the to-be-scanned document by a user, to enable the scanning module to perform the scan operation.

According to another aspect of the invention, a scanning device to be placed on a base platform includes a housing, three support feet, a glass platen, a scanning module, a control circuit, and a scan-start unit. The housing has a top surface and a bottom surface away from the top surface and close to the base platform. The three support feet are attached to the bottom surface of the housing, wherein one of the three support feet may be elastic. The glass platen is mounted on the top surface, wherein a to-be-scanned document is to be placed on the glass platen. The scanning module is movably installed within the housing for scanning the to-be-scanned document. The control circuit controls the scanning module to perform a scan operation. The scan-start unit, which is electrically connected to the control circuit and mounted on the housing, is attached to the housing and apart from the base platform by a predetermined distance. When a user exerts a direct/indirect pressing force on the to-be-scanned document, one of the support fact deforms to cause the scan-start unit to directly contact the base platform so as to enable the scanning module to start the scan operation.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The embodiments of the invention will be described with reference to the drawings.

Figure 3:
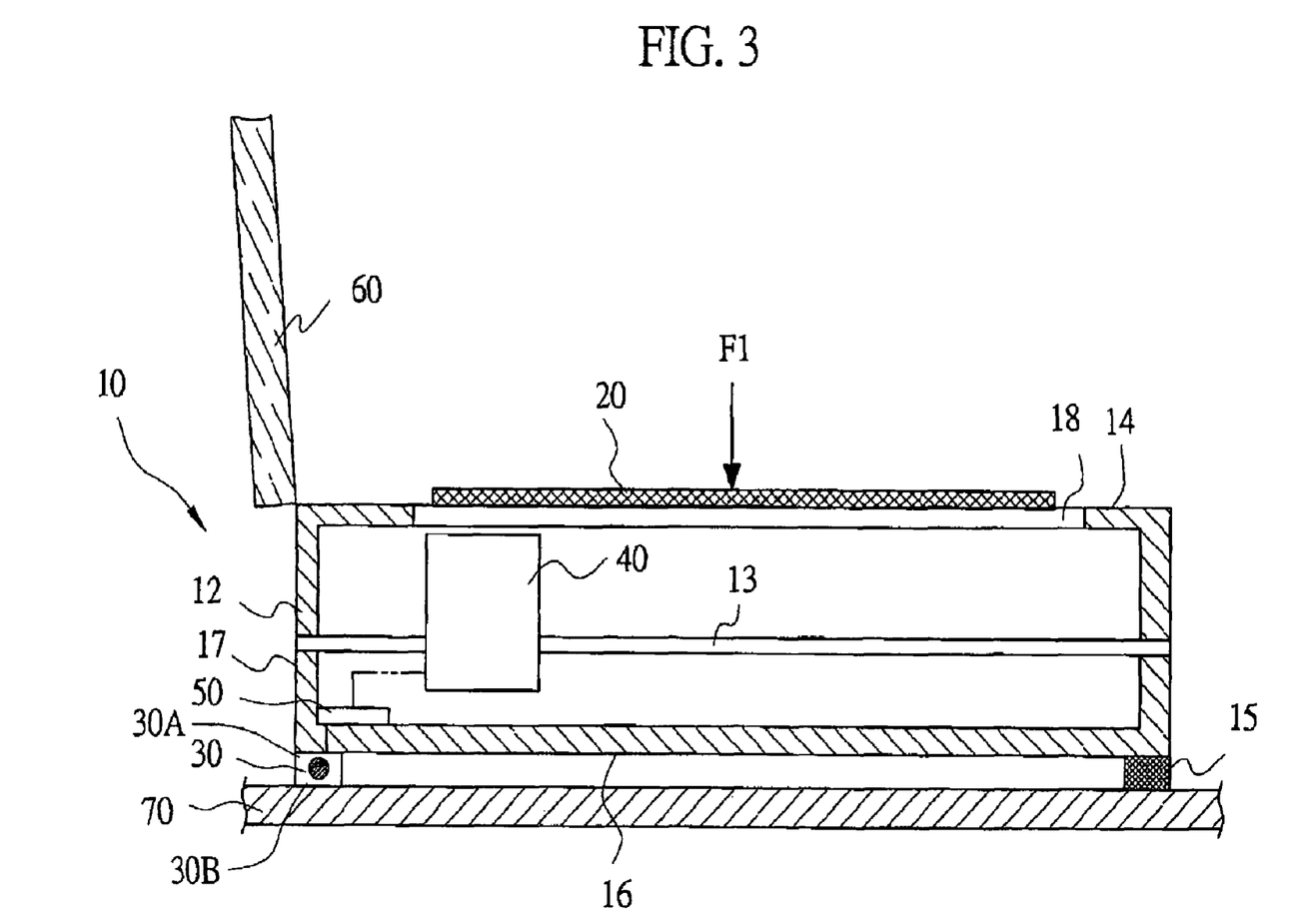
FIG. 3 is a schematic illustration showing a scanning device according to a first embodiment of the invention.

As shown in FIG. 3, a scanning device 10 capable of quickly starting scanning according to a first embodiment of the invention is placed on a base platform 70. The base platform 70 may be a table, floor, or any platform that may provide the function for the scanning device 10 of the invention. The scanning device 10 includes a housing 12, a guiding rod 13, a plurality of support feet 15, a glass platen 18, a scan-start unit 30, a scanning module 40, a control circuit 50, and an upper cover 60.

The housing 12 has a top surface 14 and a bottom surface 16 disposed away from and underneath the top surface 14 and close to the base platform 70. The guiding rod 13 is attached to the housing 12, and the support feet 15 support the housing 12 over the base platform 70. The support feet 15 are usually made of rubber for absorbing vibrations from the housing 12. The support feet 15 also directly contact the base platform 70 to prevent a sliding movement of the scanning device 10 relative to the base platform 70.

The glass platen 18 is mounted on the top surface 14. The user may place a to-be-scanned document 20, such as a book or exhibit, on the glass platen 18 for supporting the to-be-scanned document 20. The scanning module 40 is movably installed within the housing 12 to scan the to-be-scanned document 20. For example, the scanning module 40 may be moved along the guiding rod 13 to perform the scan operation. The control circuit 50 may be electrically connected to the scanning module 40 to control the scan operation of the scanning module 40. The scan-start unit 30 is electrically connected to the control circuit 50. The scan-start unit 30 has a first end 30A, which is attached to the bottom surface 16, and a second end 30B, which is in direct contact with the base platform 70 that supports the scanning device 10. The scan-start unit 30 may be an elastic switch, which turns on when being pressed and turns off when not being pressed.

In this embodiment, the support feet 15 and the scan-start unit 30 support the housing 12 at the same time. When the scan operation is not performed, the scan-start unit 30 is in direct contact with the base platform 70 but not triggered. When the scan operation is to be performed, the user may place the to-be-scanned document 20 on the glass platen 18 and then press the to-be-scanned document 20 against the glass platen 18. The user's downward pressing force against the to-be-scanned document 20 may be regarded as a direct pressing force F1 with respect to the to-be-scanned document 20, and may trigger the scan-start unit 30 to cause the scanning module 40 to perform the scan operation. In this case, the upper cover 60 and the support feet 15 may be omitted from the scanning device 10.

Alternatively, the user may also place the to-be-scanned document 20 on the glass platen 18, and then close the upper cover 60 to press the to-be-scanned document 20. Then, the user may press the upper cover 60 downward. The downward pressing force may be regarded as an indirect pressing force with respect to the to-be-scanned document 20, and may also trigger the scan-start unit 30 to cause the scanning module 40 to perform the scan operation. Thus, the pressing force, which is directly exerted on the to-be-scanned document to press the to-be-scanned document against the glass platen, acts upon the scan-start unit to enable the scanning module to perform the scan operation. That is, the pressing force which presses the to-be-scanned document 20 against the glass platen 18 enables the scan-start unit 30 to be pushed by the base platform 70 and activates the scanning module 40 to perform the scan operation.

Consequently, either a direct pressing force or an indirect pressing force for flattening the document by the user may trigger the scan-start unit 30 to cause the scanning module 40 to perform the scan operation. After the direct/indirect pressing force F1 is removed, the scan-start unit 30 will not be triggered but the scanning module 40 may still proceed with the scan operation until the scan operation is finished Hence, the user does not need to continuously exert the pressing force.

Figure 4:
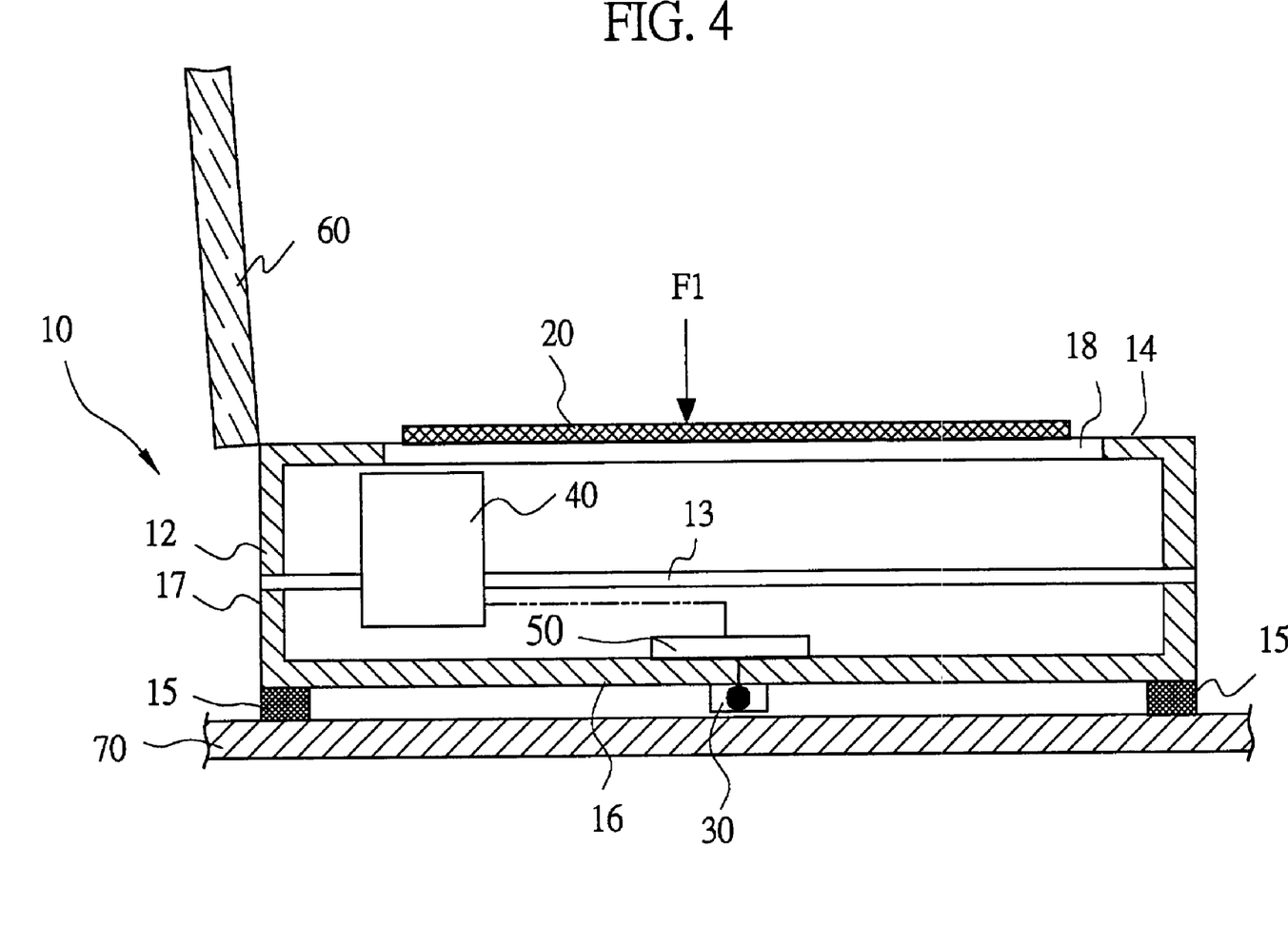
FIG. 4 is a schematic illustration showing a scanning device according to a second embodiment of the invention.

Please refer to FIG. 4, which shows a scanning device of a second embodiment that is almost similar to that of the first embodiment. The only difference between FIGS. 4 and 3 resides in that the scan-start unit 30 is arranged at the middle of the bottom surface 16 of the housing 12, and is apart from the base platform 70 by a predetermined distance at a normal state wherein the scanning device does not perform the scan operation. The user's direct/indirect pressing force F1 against the to-be-scanned document 20 may compress the elastic support feet or foot 15 to shorten the support feet of foot 15. The number of support feet 15 may be equal to or greater than 3, and at least one of the support feet 15 is elastic. At this time, the scan-start unit 30 attached to the bottom surface 16 of the housing 12 may directly contact the base platform 70, and the scan-start unit 30 is thus triggered to enable the scan operation of the scanning module 40. After the direct/indirect pressing force F1 is removed, the elasticity of the elastic support feet of foot 15 may cause the elastic support feet of foot 15 to recover to the original length(s) thereof. Then the scan-start unit 30 does not directly contact the base platform 70.

Because different users may exert different direct/indirect pressing forces F1 on the to-be-scanned document 20 or upper cover 60, it is preferable to provide an adjustable scan-start unit 30, in which the magnitude of the direct/indirect pressing force F1 for triggering the scan-start unit 30 may be adjusted.

Figure 5:
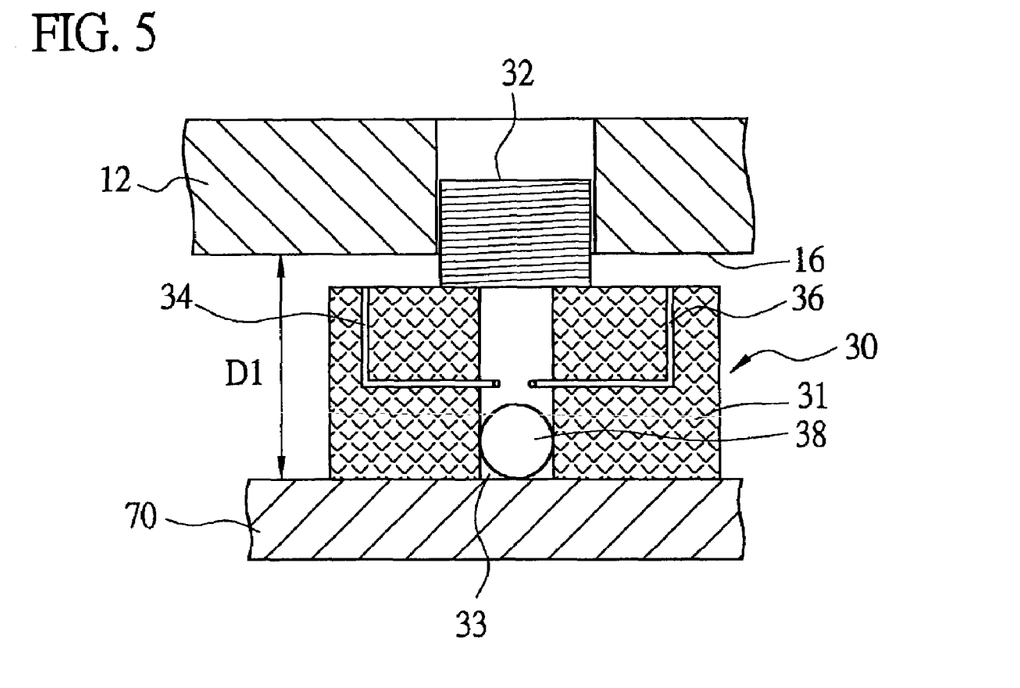
FIG. 5 is a partially enlarged view showing a first status of a first example of the scan-start unit.
Figure 6:
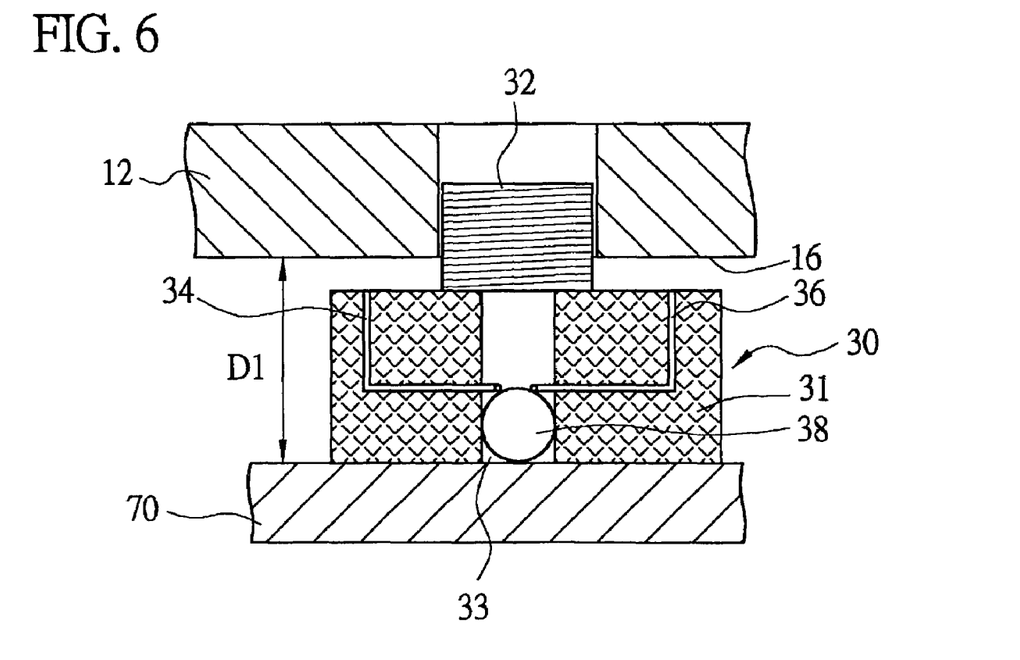
FIG. 6 is a partially enlarged view showing a second status of the first example of the scan-start unit.

Please refer to FIGS. 5 and 6 The scan-start unit 30 may be applied to the scanning device 10 of FIG. 3 or FIG. 4 The scan-start unit 30 includes a resilient member 31, an adjusting mechanism 32, a first conductor 34, a second conductor 36 and a metallic ball 38. The adjusting mechanism 32 may be, for example, an adjusting screw The user may rotate the adjusting screw to adjust the initial distance D1 between the bottom surface 16 of the housing 12 and the base platform 70. Accordingly, the magnitude of the direct/indirect pressing force F1 capable of triggering the scan-start unit 30 may be adjusted. The metallic ball 38 is arranged within a hole 33 formed in the resilient member 31.

In addition, the resilient member 31 may be made of, for example, rubber, which may be elastically deformed. Before the user exerts the direct/indirect pressing force F1, the metallic ball 38 touches the base platform 70 but does not touch the first conductor 34 and the second conductor 36, as shown in FIG. 5 When the user exerts the direct/indirect pressing force F1, the resilient member 31 is compressed and deformed. Meanwhile, the metallic ball 38 touches the first conductor 34 and the second conductor 36 so as to electrically connect the first conductor 34 to the second conductor 36, as shown in FIG. 6. In this case, the distance D1 between the bottom surface 16 of the housing 12 and the base platform 70 is shortened. Hence, the scan-start unit 30 in FIGS. 5 and 6 may be regarded as a switch In addition, other arrangements, such as the use of a spring, may be adopted to elastically move the metallic ball 38.

Figure 7:
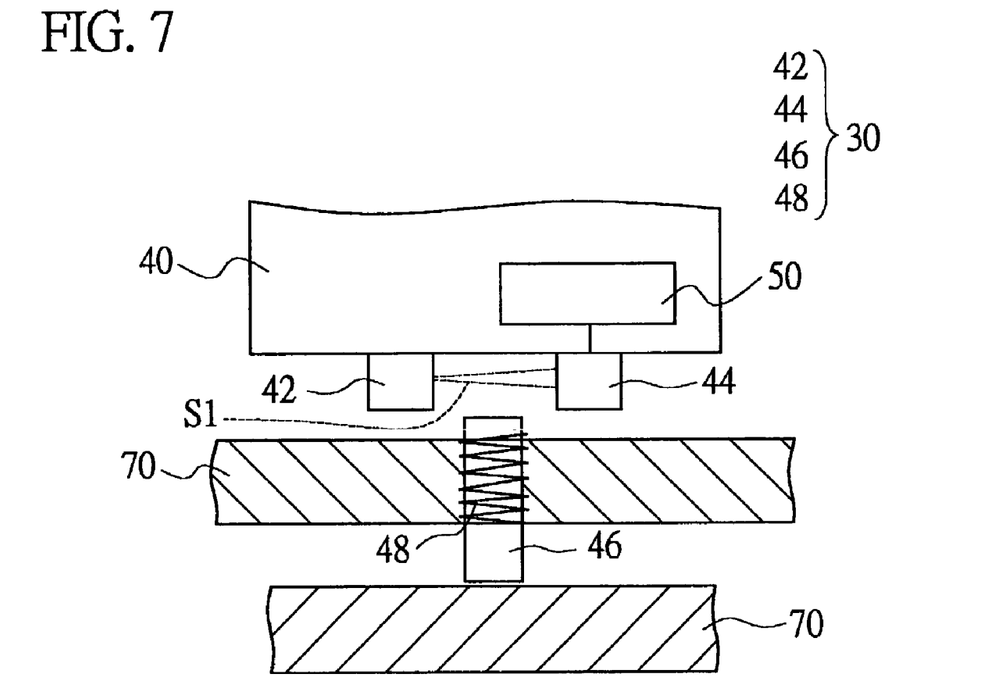
FIG. 7 is a partially enlarged view showing a first status of a second example of the scan-start unit.
Figure 8:
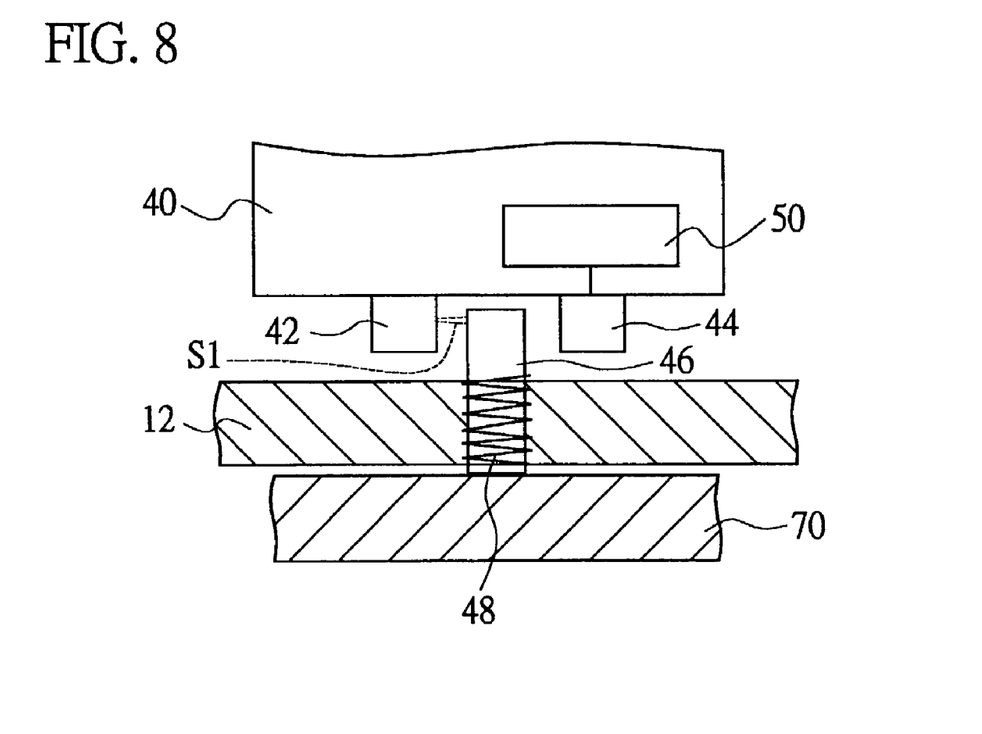
FIG. 8 is a partially enlarged view showing a second status of the second example of the scan-start unit.

Please refer to FIGS. 7 and 8 The scan-start unit 30 may be applied to the scanning device 10 of FIG. 4 and more preferably to the scanning device 10 of FIG. 3. The moving direction of the scanning module 40 is one perpendicular to the drawings. The scan-start unit 30 includes an emitter 42, a receiver 44, a blocking member 46 and a spring 48 The blocking member 46 may be moved to penetrate the housing 12. The spring 48 connects the blocking member 46 to the housing 12 so that the blocking member 46 may move elastically The emitter 42 for emitting a signal S1 is attached to the scanning module 40 and near the bottom surface 16 of the housing 12. The receiver 44 is electrically connected to the control circuit 50 within the scanning module 40 in order to receive the signal S1 from the emitter 42. Before the direct/indirect pressing force F1 is applied, the blocking member 46 does not block the signal S1, as shown in FIG. 7. When the scanning operation is to be performed, the direct/indirect pressing force F1 is applied to cause the blocking member 46 to block the signal S1 in order to start the scan operation of the scanning module 40, as shown in FIG. 8. In this example, the blocking member 46 does not need to be electrically connected to the scanning module 40, so the complicated wiring layout may be omitted.

Figure 9:
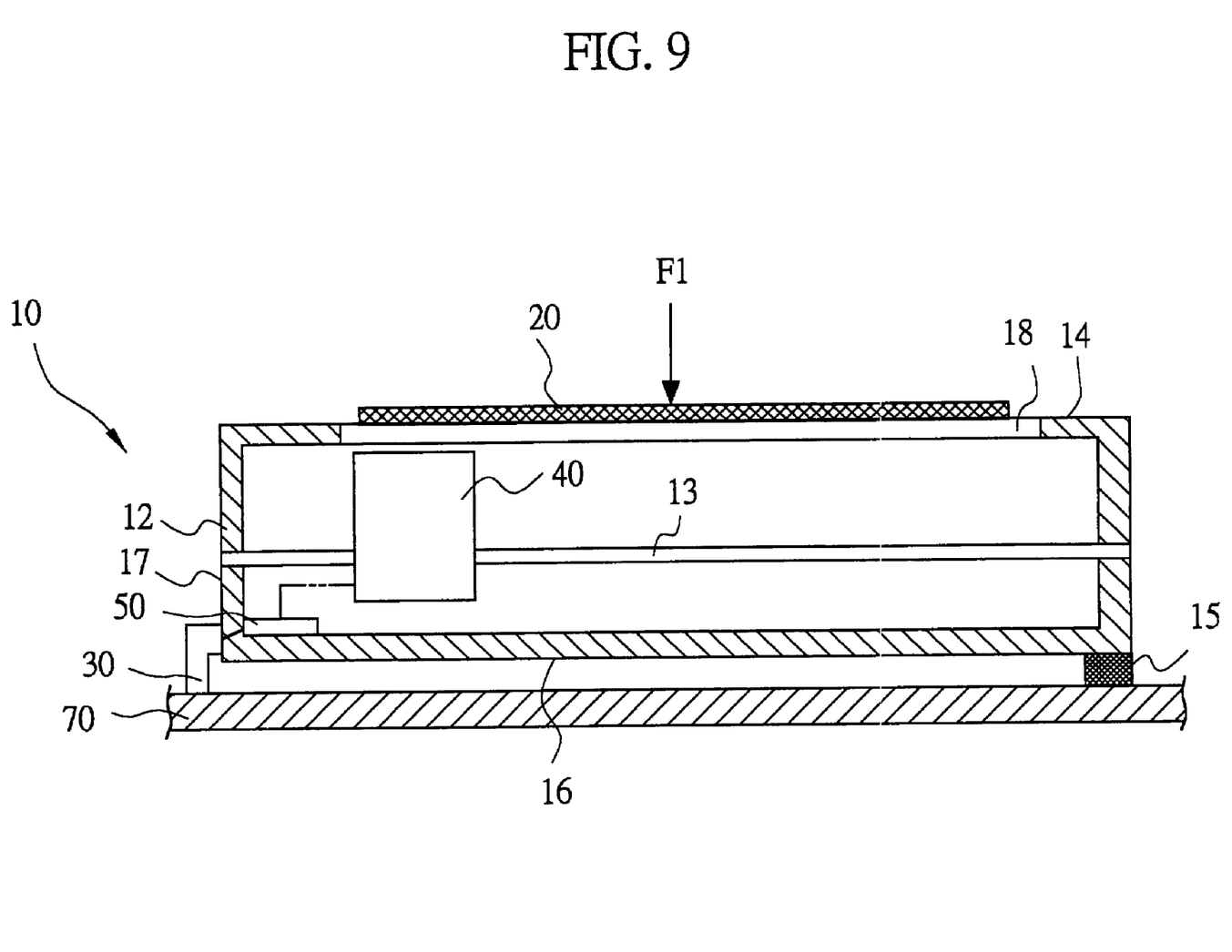
FIG. 9 is a schematic illustration showing a scanning device according to a third embodiment of the invention

Please refer to FIG. 9, in which the upper cover of the scanning device is not depicted in the drawing for the sake of simplicity. The scanning device 10 of the third embodiment is almost the same as that of FIG. 3 The only difference resides in that the scan-start unit 30 is attached to a side surface 17 of the housing 12 without influencing the normal function thereof, wherein the side surface 17 is a surface between the top surface 14 and the bottom surface 16

Figure 10:
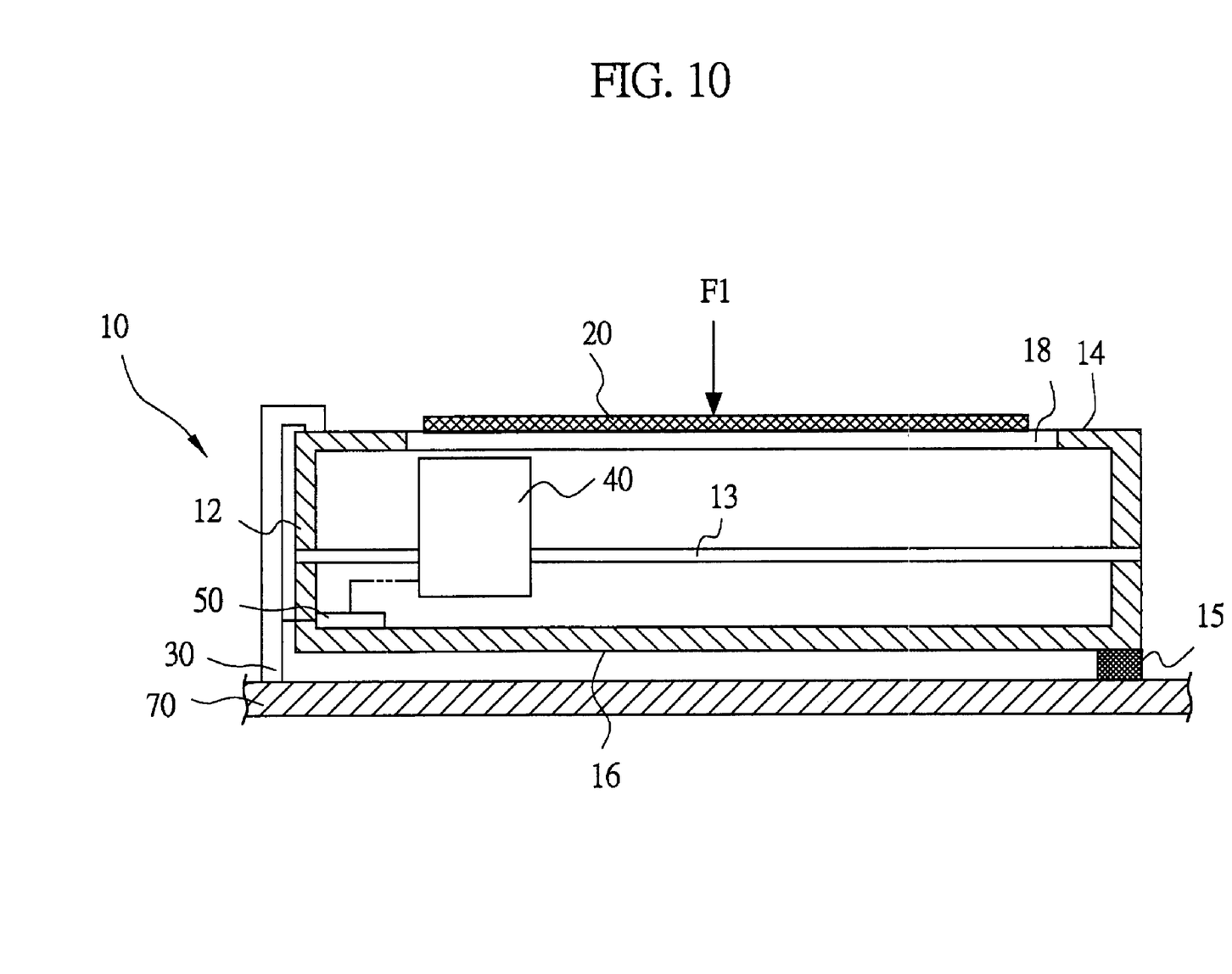
FIG. 10 is a schematic illustration showing a scanning device according to a fourth embodiment of the invention.

Please refer to FIG. 10, in which the upper cover of the scanning device is not depicted in the drawing for the sake of simplicity The scanning device 10 of the fourth embodiment is almost the same as that of FIG. 3. The only difference resides in that the scan-start unit 30 is attached to a top surface 14 of the housing 12 without influencing the normal function thereof.

It can be concluded from the third and fourth embodiments that the scan-start unit 30 of the second embodiment of FIG. 4 may also be attached to the top surface 14 or side surface 17 of the housing 12 without influencing the normal function thereof.

According to the above-mentioned structure, the invention has the following advantages.

1. Since the user's pressing force against the document may enable the scanning device to start scanning, the scanning device can be conveniently used.

2. Since the operation of the user's pressing force against the document may simultaneously enable the scanning device to start scanning, the scanning device may be quickly started.

3. Since the magnitude of the direct/indirect pressing force F1 capable of triggering the scan-start unit 30 may be adjusted by the adjusting mechanism, the desired magnitude of the pressing force can be adjusted according to the operation state, thereby achieving the objects of timesaving and laborsaving.

4. When a lot of documents are to be scanned, the open and close operations of the upper cover may be omitted, thereby saving the scanning time.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A scanning device comprising:
   a housing having a top surface and a bottom surface disposed underneath the top surface;
   a glass platen, mounted to the top surface, for supporting a to-be-scanned document;
   a scanning module, movably installed within the housing, for scanning the to-be-scanned document;
   a control circuit for controlling the scanning module to perform a scan operation; and
   a scan-start unit electrically connected to the control circuit and having a first end mounted on the housing and a second end in direct contact with a base platform which supports the scanning device, wherein a pressing force which presses the to-be-scanned document against the glass platen enables the scan-start unit to be pushed by the base platform and activates the scanning module to perform the scan operation.

2. The scanning device according to claim 1, wherein the scan-start unit is attached to the bottom surface of the housing.

3. The scanning device according to claim 1, wherein the scan-start unit comprises:
   an adjusting mechanism for adjusting a distance between the bottom surface and the base platform so as to adjust magnitude of the direct/indirect pressing force capable of triggering the scan-start unit.

4. The scanning device according to claim 1, further comprising an upper cover placed over the to-be-scanned document, wherein the user exerts the direct/indirect pressing force on the upper cover to press the to-be-scanned document accordingly.

5. The scanning device according to claim 1, wherein the scan-start unit is an elastic switch.

6. The scanning device according to claim 1, wherein the scan-start unit comprises:
   a resilient member for absorbing the direct/indirect pressing force.

7. The scanning device according to claim 6, wherein the resilient member is formed with a hole and the resilient member comprises:
   a first conductor and a second conductor; and
   a metallic ball movably arranged within the hole and in contact with the base platform, wherein when the direct/indirect pressing force is applied, the metallic ball is electrically connected to the first conductor and the second conductor; and when the direct/indirect pressing force is not applied, the metallic ball is not electrically connected to the first conductor and the second conductor.

8. The scanning device according to claim 6, wherein the resilient member is made of rubber.

9. The scanning device according to claim 1, wherein the scan-start unit comprises:
   a blocking member, which may be moved to penetrate the housing;
   a spring connecting the blocking member to the housing so as to cause the blocking member to elastically move;
   an emitter attached to the scanning module for emitting a signal; and
   a receiver electrically connected to the control circuit for receiving the signal, wherein the direct/indirect pressing force causes the blocking member to block the signal so as to enable the scanning module to start the scan operation.

* * * * *